United States Patent [19]

Saunders

[11] Patent Number: 5,684,755
[45] Date of Patent: Nov. 4, 1997

[54] UNDERWATER PINGER AUTOMATIC DEPLOYMENT SWITCH

[76] Inventor: David N. Saunders, 82 Industrial Park Dr., Saco, Me. 04072

[21] Appl. No.: 510,190

[22] Filed: Aug. 29, 1995

[51] Int. Cl.⁶ .................................................. H04B 1/02
[52] U.S. Cl. .................... 367/139; 43/9.2; 43/17; 43/17.1
[58] Field of Search .................... 43/9.2, 17, 17.1; 367/139, 910

[56] References Cited

U.S. PATENT DOCUMENTS 4,649,744  3/1987  Cotillier .................... 73/170 A
5,103,432  4/1992  Percy .................... 367/172
5,134,592  7/1992  Parra .................... 367/139
5,291,682  3/1994  Zaccheo .................... 43/17.1

*Primary Examiner*—J. Woodrow Eldred
*Attorney, Agent, or Firm*—Chris A. Caseiro; Thomas L. Bohan

[57] ABSTRACT

A position-dependent switch to sense deployment of an underwater pinger to enable operation upon deployment. During underwater deployment the pinger orients itself differently from an orientation chosen for the stowed (not deployed) condition. The position-dependent, or orientation-dependent, switch senses the pinger orientation and enables pinger operation automatically upon deployment. When the pinger is stowed the position-dependent switch disables the operation of the pinger.

4 Claims, 4 Drawing Sheets

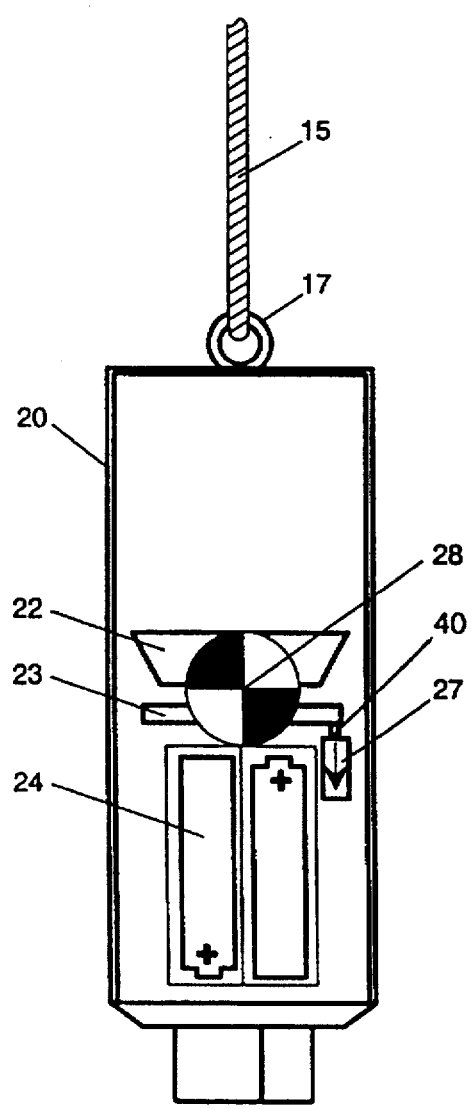
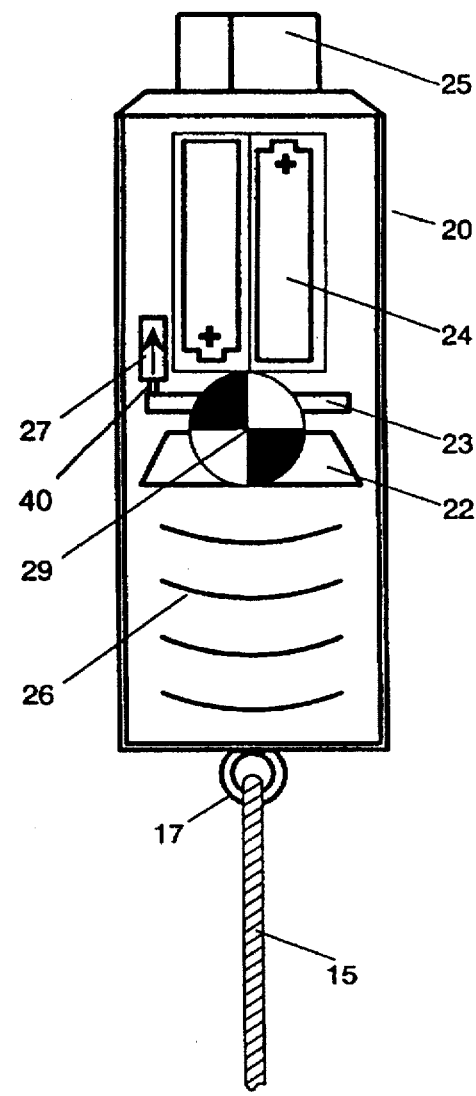
Fig. 3a
Pinger in the Stowed Position
Fig. 3b
Pinger in the Deployed Position

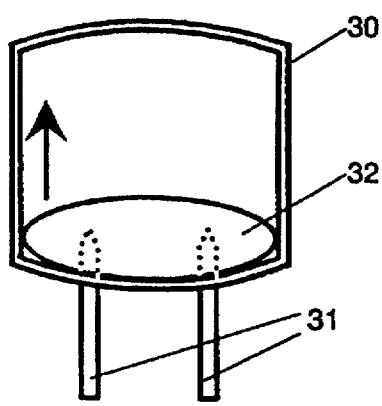
Fig. 4a
Short-Circuit
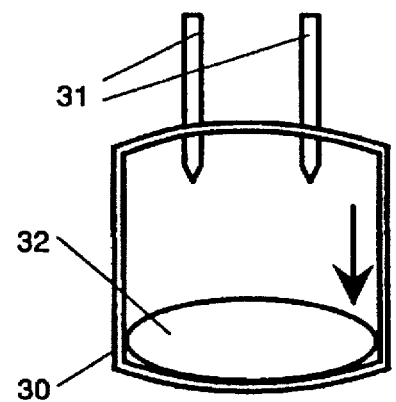
Fig. 4b
Open-Circuit
Fig. 4
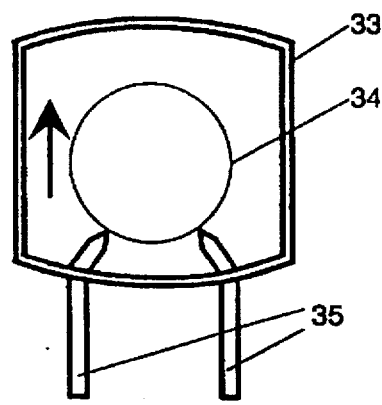
Fig. 5a
Short-Circuit
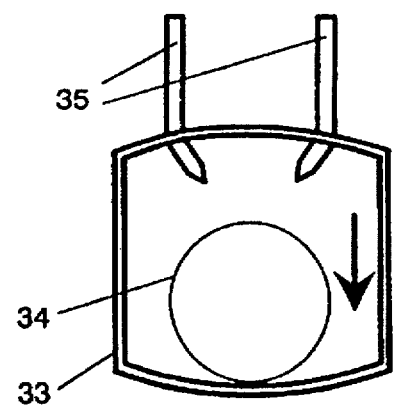
Fig. 5b
Open-Circuit
Fig. 5

UNDERWATER PINGER AUTOMATIC DEPLOYMENT SWITCH

BACKGROUND OF THE INVENTION

1. Technical Field

The present invention relates to means for alerting certain fish and marine mammals that an underwater structure is nearby. More particularly, the present invention relates to "pingers" that transmit acoustic signals in a frequency range corresponding to the hearing capability of the species of interest. Still more particularly, the present invention relates to conservation of the power source used to operate an electro-acoustic transducer of the pinger, through the use of a mechanism that automatically activates the pinger when it is deployed and deactivates it when it is not deployed.

2. Description of the Prior Art

Widely used commercial fishing techniques involve the distribution of nets underwater which entangle targeted fish species for harvest. An unwanted result is that non-targeted fish and mammals may also become entangled in the nets. These "bycatch" species have an associated mortality which is desired to be minimized. Marine mammals in particular have shown the ability to avoid fishing nets if they are made aware of the nets. One means to alert the mammals to the presence of the net is the use of acoustic pingers along the length of the net. The characteristics of the pinger acoustic emissions are chosen so that the marine mammals are alerted, but the targeted fish species are not. It has been found that most commercially targeted fish have a hearing range that extends to no more than one or two kilohertz. Marine mammals have hearing ranges that extend up to several tens of kilohertz. Therefore pingers with acoustic outputs in the frequency range of a few kilohertz to several tens of kilohertz can perform the desired function of alerting the marine mammals to the presence of the fishing gear.

A pinger is basically a battery-powered acoustic transmitter which is attached to underwater fishing nets. The pinger emits acoustic waves which alert marine mammals to the presence of the net. The pinger is enclosed in a watertight housing. A battery provides power to an electronic oscillator. The oscillator drives an electro-acoustic transducer which produces sound emissions. These sound emissions travel from the electro-acoustic transducer, through the medium inside the pinger (typically air), through the watertight housing and into the water.

Pingers are battery-powered devices. Because of the difficulty of changing the batteries and resealing the watertight housing, we desire to maximize the operational lifetime of the batteries. One way to do this is to switch the pingers off when they are not deployed and on when they are deployed.

Standard practice has been to switch underwater pingers on by a seawater sensing switch. This switch consists of a pair of electrically-conductive terminals which penetrate the watertight housing of the pinger. Upon deployment in seawater, the resistance between the sense terminals goes from a very high value to a low value. The electronics package senses this drop in resistance and enables the pinger acoustic output. This performs the desired function of saving battery power by enabling the pinger output only when the pinger is deployed. It has the disadvantage that the terminals penetrate the water-tight housing and must be carefully sealed to prevent seawater leaks into the pinger. As some pingers are deployed at depths of several hundred feet, the terminal seals must withstand pressures of two-to-three hundred pounds per square inch. Also the terminals are subject to corrosion (especially since they are part of an active electrical circuit) and have a finite life expectancy which (depending on material selection, seawater exposure and sensing current) may run from a few weeks to a few years. After the terminals have corroded they must be replaced.

Any design feature which increases the battery lifetime is valuable. This invention relates to a particular construction, developed as one part of a comprehensive program to optimize the underwater pinger operation, which increases the battery lifetime by automatically turning off the pinger when it is not deployed underwater. The construction consists of a position-dependent switch which senses the different orientation of the pinger when deployed compared to when it is stowed.

In related prior art a patent issued to Fuentes et al (U.S. Pat. No. 4,805,339) describes a fish lure with a sound transmitter. No effort was disclosed to enhance battery lifetime by inclusion of any on/off switch (manual or automatic). A patent issued to Zaccheo (U.S. Pat. No. 5,291,682) describes a fishing net system made species-selective by an underwater acoustic transmitter. Since the batteries and electronics package are not deployed underwater (only the transducers are submerged) no automatic deployment sensing mechanism is required or disclosed. A patent issued to Parra (U.S. Pat. No. 5,134,592) describes an acoustic method for scaring dolphins away from tuna nets by transmitting acoustic recordings of killer whales. Again the batteries and electronics package are not deployed underwater, and no automatic deployment sensing mechanism is required or disclosed.

SUMMARY OF THE INVENTION

This invention relates to a particular construction which increases the battery lifetime of an underwater pinger by automatically turning off the pinger when it is not deployed underwater. The pinger construction includes some attachment means which may or may not be an integral part of the housing. When stowed, the pinger orientation is determined by the relative locations of the attachment means and the pinger center-of-gravity. When deployed, the pinger orientation is determined by the relative locations of the effective net buoyant force and the attachment means. (The net buoyant force is the vector sum of the buoyant force and the gravitational force on the pinger.) The pinger orients itself differently in these two conditions. A position-dependent switch—or more specifically, an orientation-dependent switch—senses the difference between the stowed position and the deployed position. When the switch senses deployment, it activates the pinger.

BRIEF DESCRIPTION OF THE DRAWINGS

FIG. 3a shows the pinger in a stowed (off) position. FIG. 3b shows the pinger in a deployed (on) position.

FIG. 4a shows the operation of a mercury position-dependent switch in a short-circuit orientation. FIG. 4b shows the operation of a mercury position-dependent switch in an open-circuit orientation.

FIG. 5a shows the operation of a ball-type position-dependent switch in a short-circuit orientation. FIG. 5b shows the operation of a ball-type position-dependent switch in an open-circuit orientation.

DETAILED DESCRIPTION OF THE PREFERRED EMBODIMENTS OF THE PRESENT INVENTION

Figures 1, 1A:
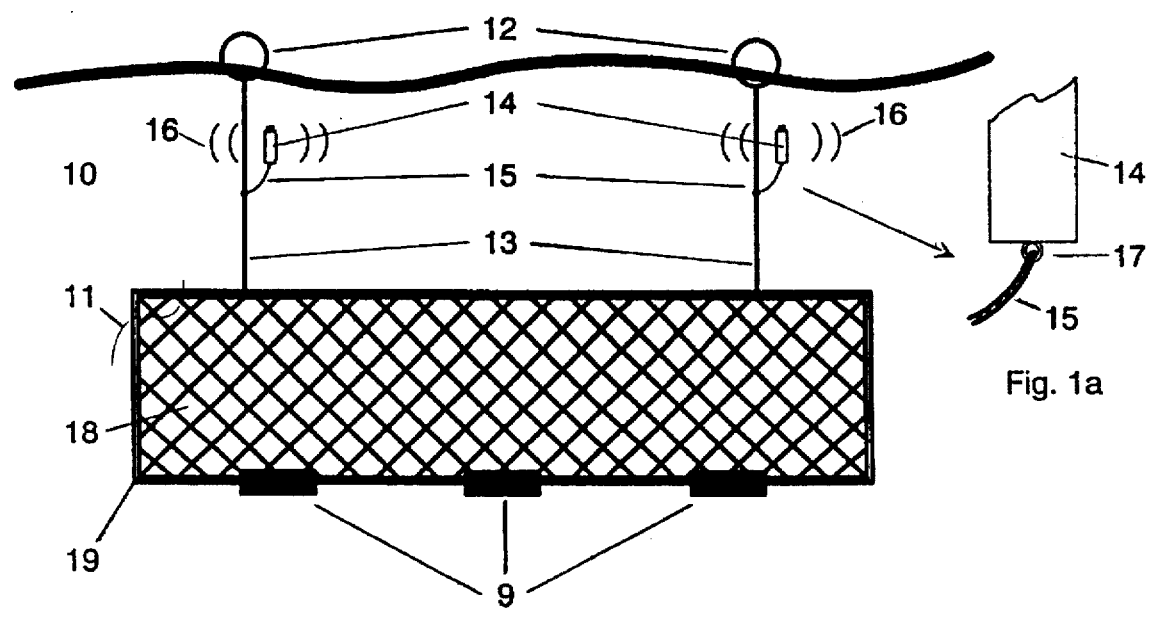
FIG. 1 shows a typical installation of underwater pinger on a fishing net, with detail of the pinger and attachment means.
FIG. 1a is a close-up view of the attachment of the pinger to the fishing net.

FIG. 1 shows a typical deployment of a fishing net 11 with attached underwater pingers 14. The pingers 14 are used to alert marine mammals to the presence of the fishing net 11. The fishing net 11 consists of a regular pattern of fabric, cord, or string 18 suspended within a frame 19. The fishing net is deployed in the water 10 with the goal of capturing the targeted marine species (fish). The fishing net 11 being ballasted by weights 9 tends to sink but is suspended from floats or buoys 12 by halters 13. The figure shows one section of fishing net. An actual deployment would typically use many attached sections to create a larger entrapment area. Underwater pingers 14 are attached to the halters 13 or elsewhere on the net by an attaching means 15 which may typically be a short section of rope or a clip. The detail FIG. 1a shows the underwater pinger 14 with the attachment means 15 connected at an attachment point 17 which is an integral part of a watertight pinger housing 20. The pingers 14 emit acoustic waves 16 into the surrounding water 10 to alert marine mammals to the presence of the fishing net. The frequency of the acoustic wave is chosen so that the non-targeted marine mammals are alerted, but the targeted fish are not alerted. The targeted fish are not alerted by the acoustic emissions because they have little or no auditory response in the frequency range of the pinger acoustic emissions.

With continuing reference to FIG. 1, there is shown a typical fishing net deployed at or near the water surface. A corresponding bottom deployment is also commonly used to catch ground-fish. In the bottom deployment the net sinks to the bottom but is held open by the floats 12. Other deployments and net configurations are used and all are candidates for the application of pingers.

Figure 2:
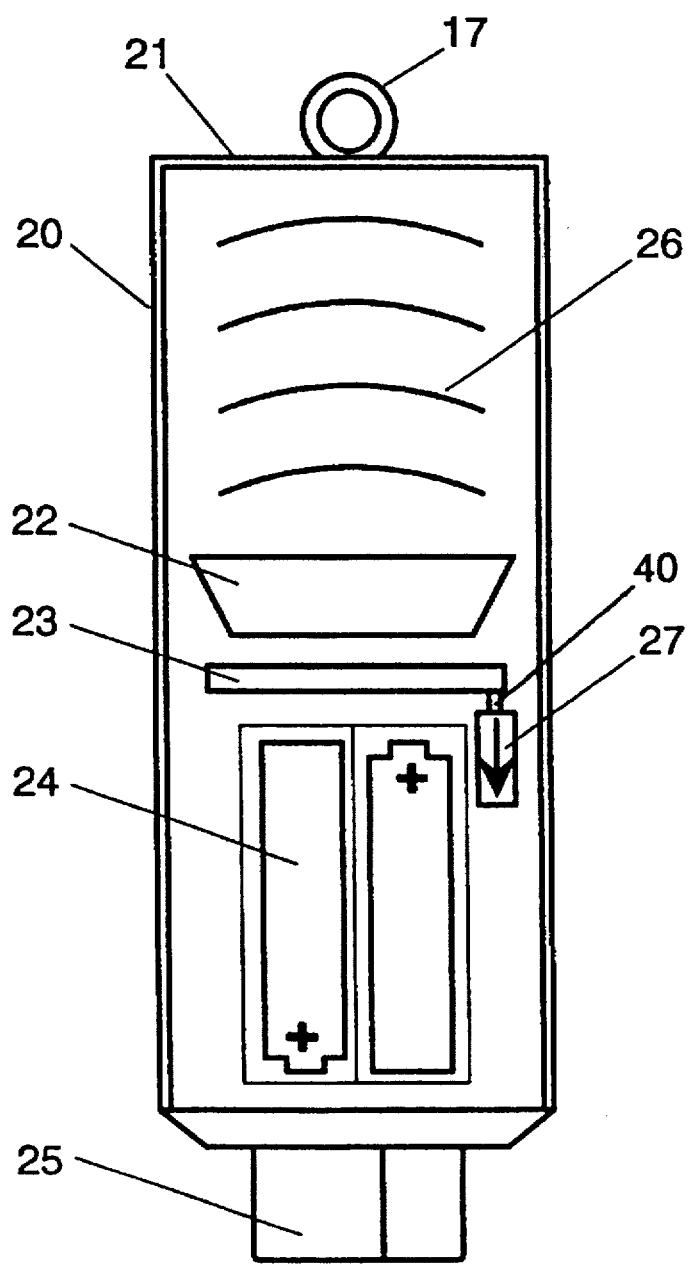
FIG. 2 shows a cross-section of the underwater pinger.

FIG. 2 shows a cross-section of the underwater pinger 14. The pinger 14 is contained within the pinger housing 20 which includes the attachment point 17 used to attach the pinger 14 to the fishing net 11. An electro-acoustic transducer 22 moves in response to electrical signals from an electronic oscillator 23. The motion of the electro-acoustic transducer 22 creates an acoustic wave 26. The acoustic wave 26 travels through an air-filled space within the pinger housing 20 to and through a pinger section 21 of the pinger housing 20 and into the surrounding water 10. The oscillator 23 will normally cause the electro-acoustic transducer 22 to oscillate in an intermittent manner rather than continuously, reducing the average power to drive the oscillator 23. The average power is reduced because the oscillator 23 consumes very little power when the electro-acoustic transducer 22 is not being actively driven. Driving the transducer 22 in an intermittent manner causes the acoustic wave 26 to be intermittent but provides an adequate protective stimulus for the subject marine mammals. Power is delivered to the oscillator 23 from a power supply such as a battery pack 24 which may consist of one or more primary or rechargeable cells.

A position-dependent switch 27 enables pinger operation when the pinger 14 is in the deployed position (switch arrow up). The position-dependent switch 27 disables pinger operation when the pinger 14 is in the stowed position (switch arrow down). The position-dependent switch 27 may be used to make or break the connection between the battery pack 24 and the oscillator 23. Alternatively, the position-dependent switch 27 may present an open or closed contact to an oscilator control input 40 such that the oscillator 23 may be enabled or disabled based on the state of the position-dependent switch 27. One skilled in the arts will readily see various combinations of switch sense (open on arrow up or open on arrow down) and oscillator control (oscillator enable (or disable) on open (or closed) switch) which may be employed with equal effectiveness in the present invention. A removable plug 25 is provided for periodic replacement of one or more batteries of the battery pack 24, or for service of the pinger 14. The plug 25 is sealed against the pinger housing 20 to maintain the watertightness of the pinger housing 20.

In the preferred embodiment of the present invention the electro-acoustic transducer 22 is a Murata-Erie PKM29-3A0 piezo-electric transducer with resonant frequency of approximately 3300 Hz. In the preferred embodiment the position-dependent switch 27 is the CW1300-1 tilt switch manufactured by Comus International.

FIGS. 3a and 3b show the pinger 14 in the stowed position (FIG. 3a) and the deployed position (FIG. 3b). In the stowed position the pinger 14 is suspended from and hangs down from the attaching means 15 (which may be a clip or a section of rope or line) connected to the attachment means 17. The attachment means 17 may or may not be an integral part of the pinger housing 20 and may simply be an eyelet for receiving the attaching means 15. A center of gravity 28 of the pinger 14 hangs directly below the attachment means 17 and the position-dependent switch 27 is oriented reference-arrow down. In the reference-arrow down position the switch 27 disables pinger operation either by breaking the connection between the battery pack 24 and the oscillator 23 or by presenting an open-circuit to the oscillator control input 40. Alternatively, the switch 27 may present a short-circuit to a suitably-configured oscillator control input. With the pinger 14 in the stowed position, the electro-acoustic transducer 22 is not driven. In the preferred embodiment the switch 27 is open when it is oriented reference-arrow down and breaks the connection between the battery pack 24 and the oscillator 23.

FIG. 3b shows the pinger 14 in the deployed position. In the deployed position, the pinger 14 tends to float but is restrained by connection of the attaching means 15 to the attachment means 17 and floats up from the attaching means 15. The attachment means 17 may or may not be an integral part of the pinger housing 20. The effective center of buoyancy 29 of the pinger 14 (taking into account both the buoyant force and the weight of the pinger 14) positions itself directly above the attachment means 17 and the position-dependent switch 27 is oriented reference-arrow up. In the arrow-up position the switch 27 enables pinger operation either by completing the connection between the battery pack 24 and the oscillator 23 or by presenting a short-circuit to the oscillator control input 40. Alternatively, the switch 27 may present an open-circuit to a suitably-configured oscillator control input. With the pinger 14 in the deployed position, the oscillator 23 drives the electro-acoustic transducer 22, thereby causing the acoustic wave 26. In the preferred embodiment of the present invention, the switch 27 is closed when it is oriented reference-arrow up and completes the connection between the battery pack 24 and the oscillator 23.

FIGS. 4a and 4b show the operation of a mercury position-dependent switch. FIGS. 5a and 5b show the operation of a ball-type position-dependent switch. In both figures a reference arrow is drawn to show the orientation of the switch. This arrow is for reference only in the figures—it has no physical significance.

In the mercury-dependent switch shown in FIGS. 4a and 4b, an amount of mercury 32 is contained in a housing 30 which also contains on one end two conductive pins 31. When the switch is oriented arrow-up (FIG. 4a) the mercury 32 surrounds a portion of the pins 31 and completes an electrical connection between the pins 31. Each of the pins 31 is electrically connected to a separate node of the oscillator control input 40. In the arrow-down orientation (FIG. 4b) the pins 31 are removed from the mercury 32 and thus present an open-circuit. While the switch is designated as being either a short-circuit or an open-circuit, it is to be understood that the short circuit may present some electrical resistance to current due to contact resistance, and the open circuit may present some finite resistance due to leakage paths in the switch. These conditions do not materially impact the operation of the switch in the pinger application.

In the ball-type switch shown in FIGS. 5a and 5b, a conductive ball 34 is contained in a housing 33 which also contains on one end two conductive pins 35. Each of the pins 35 is electrically connected to a separate node of the oscillator control input 40. When the switch is oriented arrow-up (FIG. 5a) the conductive ball 34 rests on the tips of the conductive pins 35 and completes an electrical connection between the pins 35. In the arrow-down configuration (FIG. 5b) the ball 34 falls away from the pins 35 and the pins 35 present an open-circuit.

While two types of position-dependent switch have been described herein, other position-dependent switch designs will be obvious to one skilled in the arts. Any of these position-dependent switches may be adapted to implement the function of pinger on/off control. The choice of switch is made based on economic, reliability and manufacturing considerations.

While the present invention has been described with particular reference to particular example embodiments, it is to be understood that all modifications and equivalents fall within the scope of the following claims.

I claim:

1. A pinger apparatus for alerting marine creatures to the existence of a fishing net located in water, said pinger apparatus comprising:

a. a housing;
   b. an oscillator and an electro-acoustic transducer positioned within said housing for creating and transmitting an acoustic wave at a frequency in the hearing range of said marine creatures;
   c. a battery pack positioned within said housing and connected to said oscillator, said battery pack including one or more batteries;
   d. an attachment ring located on an exterior surface of said housing, wherein said attachment ring joins said housing to said fishing net and determines an orientation of said housing when deployed; and
   e. an orientation-dependent switch for coupling said battery pack to said oscillator, wherein said switch is oriented within said housing such that when said housing is deployed in said water, said switch completes a connection between said oscillator and said battery pack.

2. The pinger apparatus as claimed in claim 1 wherein said orientation-dependent switch is any switching means configured to change switching state based on its orientation.

3. The pinger apparatus as claimed in claim 2 wherein said orientation-dependent switch is a mercury tilt switch.

4. The pinger apparatus as claimed in claim 2 wherein said orientation-dependent switch is a ball-type tilt switch.

* * * * *